United States Patent [19]

White

[11] Patent Number: 5,577,646
[45] Date of Patent: Nov. 26, 1996

[54] PET CARRIER FOR BICYCLE

[76] Inventor: Richard D. White, 516 Ginger Sq., NE., Leesburg, Va. 22075

[21] Appl. No.: 386,519

[22] Filed: Feb. 6, 1995

[51] Int. Cl.⁶ ........................................................ B62T 7/04
[52] U.S. Cl. ........................ 224/422; 224/424; 224/431; 224/435; 224/440; 220/335; 119/496; 119/453
[58] Field of Search ................................ 224/30 R, 32 R, 224/32 A, 38, 39, 40; 119/15, 17, 19; 220/335, 343

[56] References Cited

U.S. PATENT DOCUMENTS

| | | | |
|---|---|---|---|
| 598,513 | 2/1898 | Henkel | 224/32 R |
| 2,229,756 | 1/1941 | McCann et al. | 224/32 R |
| 4,266,703 | 5/1981 | Litz | 224/32 A |
| 4,440,331 | 4/1984 | Schimmels | 224/30 R |
| 4,501,384 | 2/1985 | Itoh | 224/32 R |
| 4,588,114 | 5/1986 | Lebaron et al. | 224/32 A |
| 4,711,381 | 12/1987 | Felder | 204/32 R |
| 5,016,570 | 5/1991 | Henson | 119/19 |
| 5,423,462 | 6/1995 | Dickhaus | 224/32 A |

FOREIGN PATENT DOCUMENTS 538542  4/1993  European Pat. Off. ............ 224/32 R

*Primary Examiner*—Henry J. Recla
*Assistant Examiner*—Gregory M. Vidovich
*Attorney, Agent, or Firm*—Roland H. Shubert

[57] ABSTRACT

A carrier for transporting a small pet on a bicycle includes a box-like container provided with a hatch that forms the front portion of the container top. The hatch is hinged at its back side and opens upwardly to allow the pet to extend its head from the container while facing forward. A pair of rails fixed to the container bottom are arranged to detachably couple to a rack that is mounted above the rear wheel, and behind the seat of a bicycle.

13 Claims, 4 Drawing Sheets

5,577,646

PET CARRIER FOR BICYCLE

TECHNICAL FIELD

This invention relates generally to a carrier for small pets that detachably mounts behind the seat and over the rear wheel of a bicycle.

In a specific embodiment of the invention, the carrier is arranged to be easily attached to and detached from a bicycle, and to serve as a transportable housing, or carrying cage, for a pet when not mounted on a bicycle.

BACKGROUND ART

Many kinds of specialized carriers have been developed for use with bicycles and motorcycles. Typically, such carriers are mounted above the rear wheel behind the rider. Some are arranged to carry packages and merchandise, and others to carry an infant or small child. An example of the first type is shown in U.S. Pat. No. 4,266,703 to Litz. That patent describes a luggage box having tongued rails on its underside that are arranged to interlock with grooves in a plate mounted to the frame of a motorcycle just back of the rider's seat. The rails have a locking means to secure the luggage box to the motorcycle frame plate, and to allow its convenient removal from the cycle.

A patent to Lebaron et al., U.S. Pat. No. 4,588,114, shows another arrangement of a luggage carrier that detachably mounts to a motorcycle in much the same fashion as does the luggage box of Litz. The luggage carrier described by patentees includes a box having a set of guide grooves that interlock with projecting ledges of a base member that is mounted above the rear wheel of a motorcycle. Yet another carrier assembly for mounting on the back of a motorcycle is described in U.S. Pat. No. 3,625,405 to Kezar and McCleary. Their carrier includes a box affair sized to hold a helmet, and hinged at the box front so that the box lid can be fixed in a vertical position, and so function as a backrest for a passenger seated behind the driver.

An example of the second type of carrier is shown in a patent to Schimmels, U.S. Pat. No. 4,440,331. That patent describes a carrier assembly for transporting a child on a bicycle. It is arranged to detachably lock onto a bracket fixed above the rear wheel of a bicycle, or to be secured to a vehicle seat to provide protection during auto transport.

Other carriers designed for transporting a child and arranged to be mounted on the back of a bicycle are shown by patents to Martelet, U.S. Pat. No. 4,053,091, and to Mahvi et al., U.S. Pat. No. 5,234,143. Martelet describes a carrier that is mounted above the rear wheel of a bicycle to provide a rigid platform that may be used either to carry luggage, or to support a child seat. The seat is detachably secured to and supported by the carrier platform. Mahvi et al disclose a multipurpose traveling bag which includes a fold down seat for an infant, and is adapted for mounting on a bicycle.

There has also been a suggestion in the art to provide means for transporting a pet on a bicycle. One such carrier device is shown in U.S. Design Pat. No. 276,713. That carrier comprises a flat-bottomed, generally rectangular box with an open top. The box is provided with a pair of ties that apparently are attached to a collar or harness worn by the pet to keep it in place within the carrier.

Despite the wide variety of specialized carriers that have been developed over the years, the art has not provided a safe, versatile and durable carrier to transport small to medium sized pets on bicycles. This invention fills that need.

DISCLOSURE OF THE INVENTION

This invention provides a versatile animal carrier that is adapted for the safe transport of small pets on bicycles, and for their temporary confinement. The carrier itself comprises a box-like container having generally vertical sides, and a flat bottom that is arranged to be detachably mounted to a frame that is fixed horizontally over the rear wheel of a bicycle. The container top slopes upwardly from the rear to the front, and includes an upwardly opening hatch that is hinged at the rear for placing the pet into and removing it from the carrier. Ventilation slots are provided in the container sides, and portions of the hatch and front container area may be constructed of a transparent material so that the pet may see out of the carrier. The carrier is equipped with a handle located on the container top rearward of the hatch hinge, and near the center of balance of the container. When detached from the bicycle, the animal carrier of this invention can be used as a temporary cage to transport animals from place to place by automobile or other conveyance.

Accordingly, it is an object of this invention to provide a multi-purpose animal carrier for transporting small pets.

It is another object of this invention to provide a safe and enjoyable way for bicyclists to take their pets along on a ride.

Other objects will become apparent to one skilled in the art from the following description of various modes for carrying out the invention.

MODES FOR CARRYING OUT THE INVENTION

Figure 1:
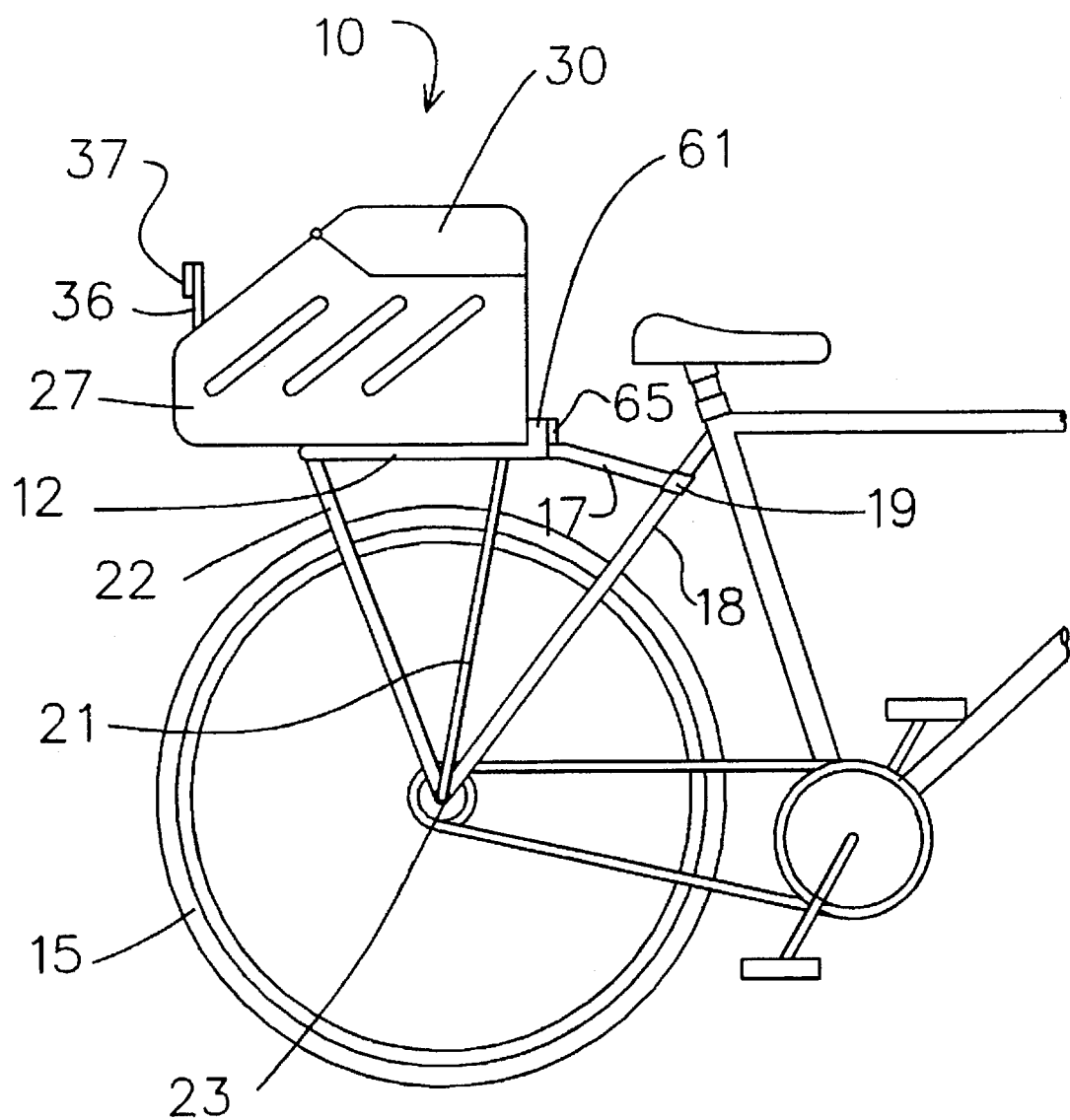
FIG. 1 is a side elevational view of the pet carrier of this invention mounted to a bicycle.

This invention provides a multipurpose carrier for a small pet that is arranged to be detachably mounted behind the seat and above the rear wheel of a bicycle. The carrier 10 is shown mounted on a bicycle in FIGS. 1 and 2. Various embodiments of the invention will be described and discussed with reference to the drawing figures in which like reference numbers refer to the same component or part illustrated in the various figures.

Figure 2:
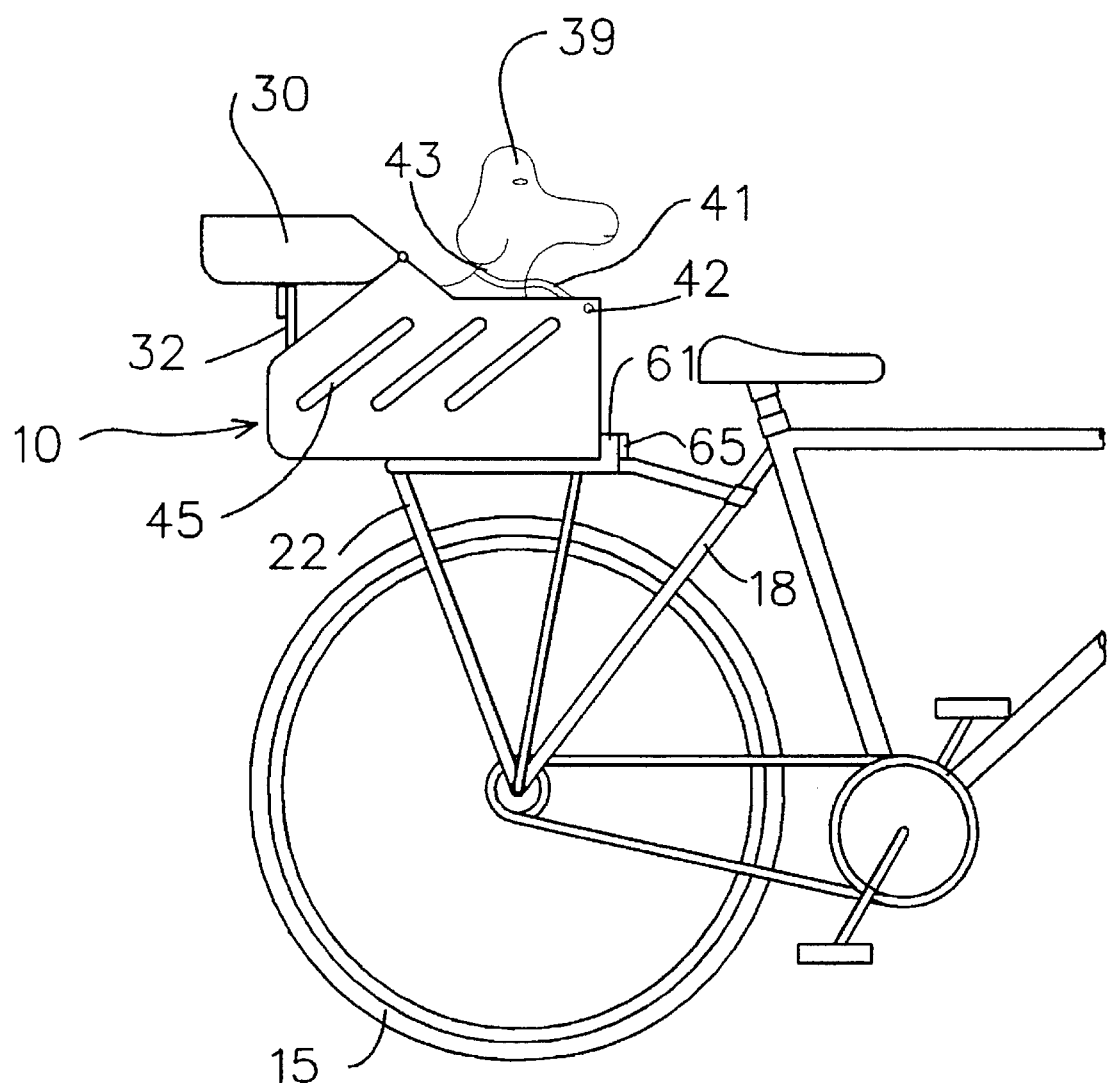
FIG. 2 shows the bicycle and carrier of FIG. 1 as it is used in transporting a small pet.

Referring now to FIG. 1 and FIG. 2 in combination, carrier 10 is shown mounted upon a rack 12 that is aligned with the longitudinal axis of the bicycle, and forms a generally horizontal platform behind the bicycle seat 14, and above its rear wheel 15. Rack 12 is held in place by means of a forward extension member 17 which is attached to the rear frame brace 18 of the bicycle through a clamp means 19. Additional support for rack 12 is provided by downwardly depending front leg 21 and rear leg 22. The lower ends of legs 21 and 22 attach to the rear bearing fork 23 of the bicycle.

Figure 3:
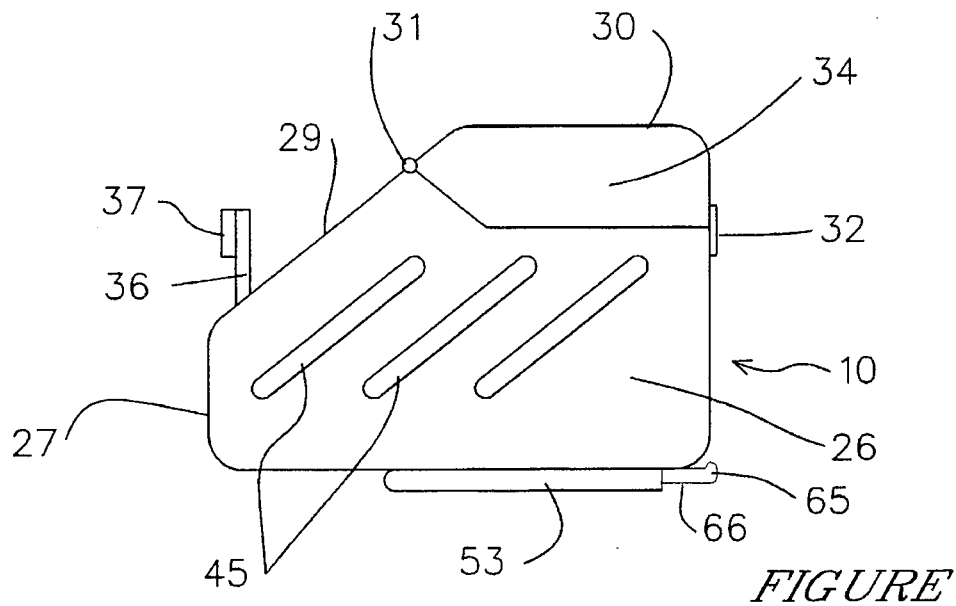
FIG. 3 is a side view of the pet carrier alone.
Figure 4:
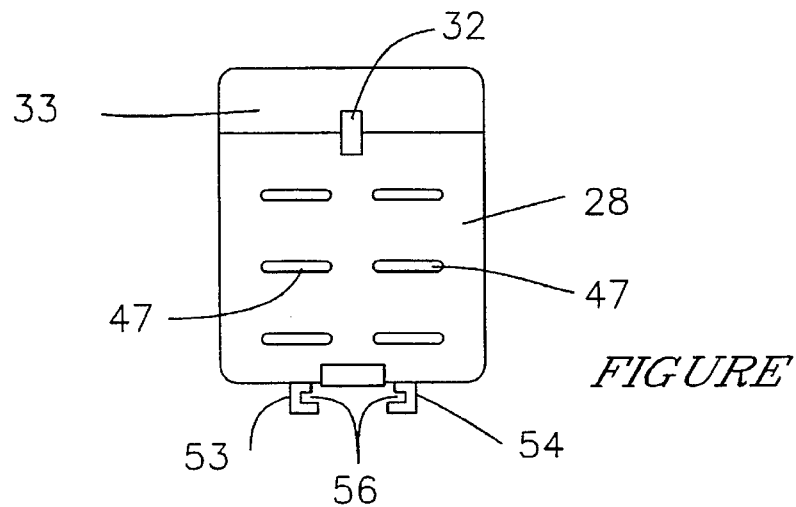
FIG. 4 is a front elevational view of the carrier of FIG. 3.
Figure 5:
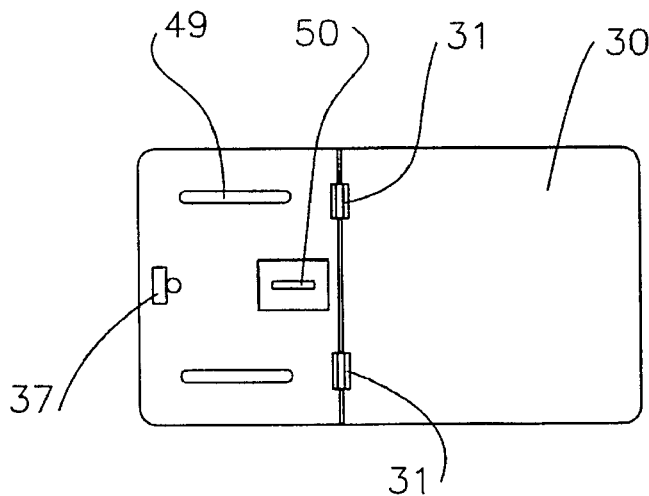
FIG. 5 is a top plan view of the FIG. 3 carrier.

Carrier 10 comprises a box-like container having generally vertical sides 26 and a flat bottom 25 as is shown in more detail in FIGS. 3, 4, and 5. In a preferred embodiment, the rear wall 27 of carrier 10 is shorter than is the front 28, with the back portion 29 of the carrier top sloping upwardly to a point at the rear of hatch 30. Hatch 30 is sized for the handy loading of a pet into the carrier. It conveniently extends from the carrier front a distance approximately half the length of the carrier, where it attaches to top portion 29 by means of hinges 31. The hatch front 33 and hatch sides 34 extend downwardly forming an extension of the upper portion of the carrier sides 25 and front 28 when the hatch is closed. A hasp 32 is provided at the front of the carrier to secure hatch 30 to the carrier front 28, and to hold the hatch in a closed position. The hinges 31 are arranged to allow the hatch to open backwardly to rest upon the top of post 36 as is shown in FIG. 2. A reflector or light 37 may be mounted upon post 36 to increase the visibility of the bicycle and carrier.

A pet may be transported on a bicycle with the hatch 30 either closed, as in FIG. 1, or open as in FIG. 2. Pets, dogs in particular, tend to prefer facing forward when riding in the carrier, and wish to see where they are going. The arrangement of hatch 30 with its downwardly extending sides and front significantly contributes to the comfort of a pet 39 being transported therein. That arrangement affords the pet visibility without causing it to strain in efforts to extend its head above the carrier sides. Safety of the pet 39 is enhanced when transporting it with the hatch open by providing a short tie leach 41 that is connected at one end to an anchor point 42 located on the interior of the carrier front 28. Leach 41 connects at its other end to a collar 43 around the pet's neck, or to a harness worn by the pet. The location of anchor point 42 and the length of leach 41 are selected such that the pet cannot jump out of the carrier when the leach is connected to its collar.

It is preferred that hatch 30 be constructed of a transparent material so as to allow visibility for a pet carried therein with the hatch closed. In this instance, it is preferred as well that sloping back portion 29 of the carrier top be constructed of an opaque material so as to provide sun protection. Moldable plastics are preferred as the construction material both for the hatch and other transparent portions of the carrier, and for the opaque carrier parts as well. Other materials of construction, including sheet metal and glass, can be used as well but are less preferred. In addition to the hatch, portions of the carrier sides 25 and of the front 28 as well, may be constructed of the same transparent material as is used for the hatch. Ventilation Openings or slots 45 are provided in the carrier sides 25. Similarly, ventilation slots 47 may be provided in the carrier front 28, and additional slots 49 may be located in the sloping carrier top 29. A carrying handle 50 is centered in the top 29 just aft of hinges 31 for use in moving the carrier from place to place when it is not mounted upon a bicycle.

Figure 6:
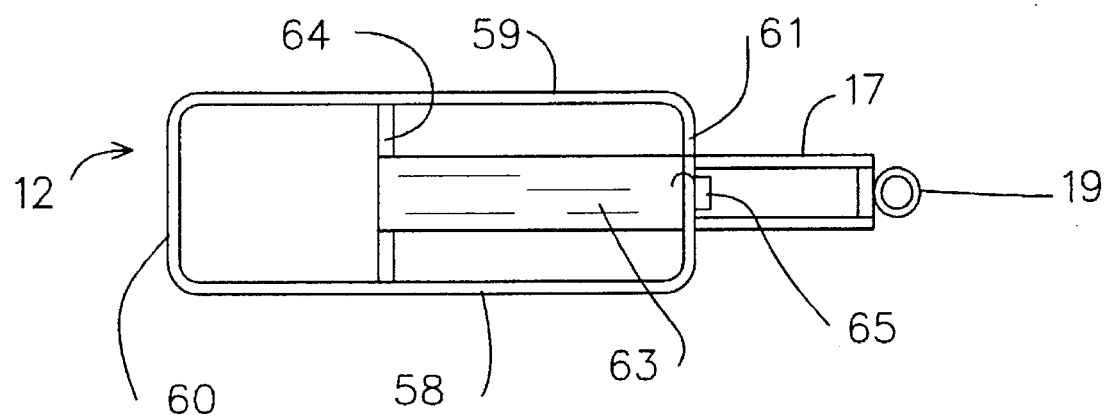
FIG. 6 is a top view of a supporting frame for mounting the pet carrier to a bicycle.
Figure 7:
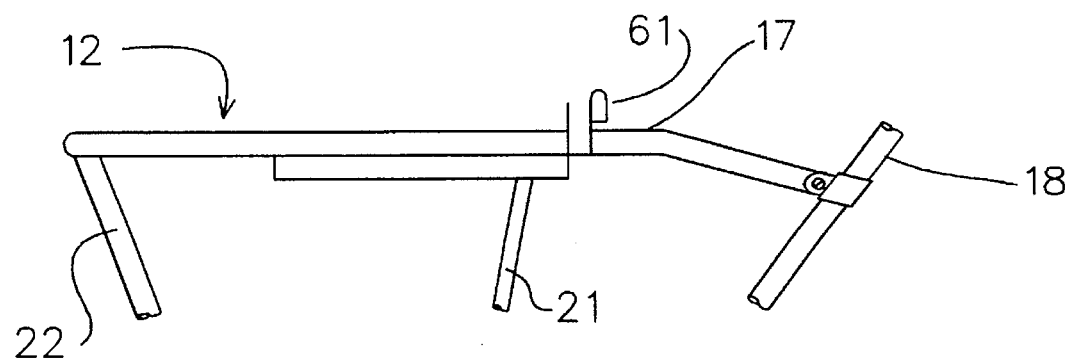
FIG. 7 is side view of the frame of FIG. 6.
Figure 8:
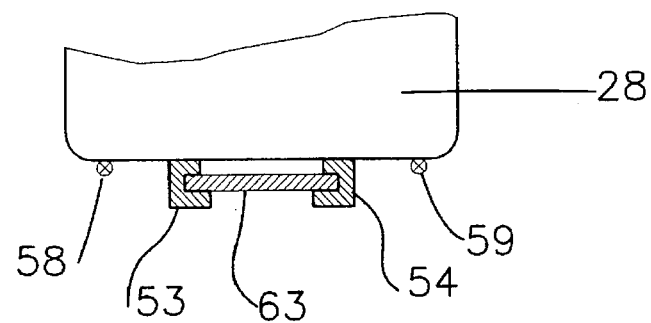
FIG. 8 is a partial sectional view showing the mounting of the carrier upon the frame.

Means are also provided to detachably, but securely, couple the carrier 10 to the rack 12 of a bicycle. Those means, in a preferred embodiment, comprise a pair of parallel rails 53 and 54 fixed to and extending longitudinally along the bottom of carrier 10. Each rail is formed with a slot 56 extending the length of the inward side thereof, as is best seen in FIG. 4. Referring now to FIGS. 6, 7 and 8, FIG. 6 shows a top plan view of the rack 12, while FIG. 7 presents a side view thereof. That rack includes rack sides 58 and 59 with rear cross-member 60 and front latch member 61. A frame plate 63 is positioned between, parallel to, and slightly below rack sides 58 and 59. It is sized such that its edges slidingly fit within slots 56 of rails 53 and 54, as is best shown in FIG. 8. A cross bar 64 extending between rack sides 58 and 59 is arranged to support the end of frame plate 63 without interfering with the sliding fit of plate 63 within the rail slots 56.

Carrier 10 is coupled to bicycle-carried rack 12 by engaging frame plate 63 within the rail slots 56, and sliding the carrier forward until it seats. As is best seen in FIG. 8, which is a partial sectional view through the rack 12 and the carrier rails 53 and 54, when the frame plate is seated within the rail slots, additional support is provided to the carrier bottom by rack sides 58 and 59. The carrier is fastened in a seated position upon the rack through a locking means at the front of the carrier. That locking means comprises an upwardly extending detent 65 at the forward end of a resilient member 66 that is secured to the bottom front of carrier 10 between rails 53 and 54. Detent 65 locks into position forward of front latch member 61 as is generally shown in FIG. 6. The carrier may be removed from the bicycle rack simply by pressing detent 65 downwardly until it clears latch member 61. At that time, the carrier may be slid backward until rails 53 and 54 disengage frame plate 63. The carrier may then be picked up, using handle 50, and employed as a conventional pet confinement or transport cage. Similar latch and detent means to lock the carrier to the frame may be provided at the rear of frame plate 63 instead of, or in addition to, those provided at the front.

As may be seen from the foregoing description of the invention, there has been provided a carrier for a small pet that can be easily attached to and removed from a bicycle. The carrier also serves as a confinement cage to safely house the pet when the carrier is not is use for its primary purpose of bicycle transport. At such times, at a picnic, rest break or hike for example, the carrier can be easily demounted from the bicycle, and the carrier used to transport the pet from place to place.

It is to be understood that the pet carrier described in the specification and illustrated in the drawings represents only those presently preferred embodiments of the invention. Various other modifications and additions may be made to the disclosed embodiments without departing from the spirit and scope of the invention. For example, the pet carrier may include a variety of accessory items useful in the routine care of small animals. Such accessories may include a mat or pad for the carrier floor, food and water containers and dishes, a leach holder, identification cards, and other similar items. Those and other modifications may be implemented to adapt the present invention for use in a variety of applications.

I claim:

1. A pet carrier for use with a bicycle having a rear wheel and a seat, the carrier comprising:

a box-like container having a front end and a rear end, generally vertical sides, a top and a flat bottom, the rear container end being shorter than the front container end;

a hatch forming a front portion of said container top, said hatch connected by hinge means to a rear portion of said container top, and adapted to swing open upwardly and backwardly about said hinge means, the rear portion of said container top sloping upwardly from the rear container end to the hinge means;

post means mounted on the rear portion of said container top to support said hatch when it is in an open position; and means fixed to said container bottom adapted to detachably couple said container to a rack means, said rack means adapted to be mounted above the rear wheel of the bicycle and behind the seat thereof.

2. The carrier of claim 1 wherein said hatch is formed with a front and sides that extend downwardly to form an extension of said container front end and sides, respectively, when the hatch is in a closed position.

3. The carrier of claim 2 wherein said hatch is constructed of a transparent material.

4. The carrier of claim 1 wherein said rear container end is constructed of an opaque material so as to provide shade for a pet carried therein.

5. The carrier of claim 1 wherein means adapted to increase the visibility of said container are mounted on said post.

6. The carrier of claim 1 including a carrying handle mounted in the center of said rear container top portion just back of said hinge means.

7. The carrier of claim 1 wherein ventilation openings are provided in the sides and front end of said container.

8. The carrier of claim 1 including anchor means inside said container at the front end thereof, said anchor means adapted for connection to restraining means that are arranged to prevent a pet carried in said container from escaping therefrom.

9. The carrier of claim 1 wherein said means to couple the carrier to said rack means comprise a pair of parallel rails fixed to and extending longitudinally along the underside of said carrier bottom, each said rail having a slot extending the length of the inward side thereof.

10. The carrier of claim 9 wherein said rack means comprises a plate member disposed horizontally along the longitudinal axis of said bicycle, said plate member sized to fit within the slots in said rails.

11. The carrier of claim 10 including locking means to secure said carrier onto said plate member.

12. The carrier of claim 11 wherein said locking means comprise an upwardly extending detent at the forward end of a resilient member that is attached to a front edge of the bottom of said carrier, said detent arranged to engage a latch member disposed at the forward end of said plate member.

13. A pet carrier for use with a bicycle having a rear wheel and a seat, the carrier comprising:

a box-like container having a front end and a rear end, generally vertical sides, a top and a flat bottom;

a hatch forming a front portion of said container top, said hatch connected by hinge means to a rear portion of said container top, and adapted to swing open upwardly about said hinge means;

a pair of parallel rails, each rail having a slot extending the length of the inward side thereof, said rails fixed to the container bottom and extending longitudinally along the underside of said container bottom to detachably couple the container to a rack means adapted to be mounted above the rear wheel of the bicycle behind the seat thereof, said rack means comprising a plate member disposed horizontally along the longitudinal axis of the bicycle and sized to fit within the slots in said rails; and locking means to secure the container onto the plate member, said locking means comprising an upwardly extending detent at the forward end of a resilient member attached to a front edge of the bottom of the container, the detent arranged to engage a latch member disposed at the forward end of said plate member.

\* \* \* \* \*